(12) United States Patent
Newman et al.

(10) Patent No.: US 7,366,346 B2
(45) Date of Patent: Apr. 29, 2008

(54) COLOR DESCRIPTOR DATA STRUCTURE

(75) Inventors: Todd D. Newman, Palo Alto, CA (US); Sharon A. Henley, Mountain View, CA (US); John S. Haikin, Fremont, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 784 days.

(21) Appl. No.: 10/651,007

(22) Filed: Aug. 28, 2003

(65) Prior Publication Data

US 2005/0047648 A1 Mar. 3, 2005

(51) Int. Cl.
*G06K 9/00* (2006.01)

(52) U.S. Cl. ........................................ 382/162; 382/167

(58) Field of Classification Search ................ 382/162, 382/167; 358/518; 345/589
See application file for complete search history.

(56) References Cited

U.S. PATENT DOCUMENTS

| 5,751,852 | A * | 5/1998 | Marimont et al. ........... 382/180 |
| 6,373,979 | B1 * | 4/2002 | Wang .......................... 382/165 |
| 6,603,483 | B1 * | 8/2003 | Newman ...................... 345/593 |
| 2001/0031084 | A1 | 10/2001 | Cannata et al. ............. 382/167 |
| 2002/0012461 | A1 | 1/2002 | MacKinnon et al. ......... 382/164 |
| 2002/0097907 | A1 | 7/2002 | Fukasawa .................... 382/167 |
| 2003/0016862 | A1 | 1/2003 | Ohga ........................... 382/162 |

OTHER PUBLICATIONS

U.S. Appl. No. 09/443,796, filed Nov. 19, 1999 (Newman et al.), pending.

U.S. Appl. No. 09/540,012, filed Mar. 31, 2000 (Haikin et al.), pending.

Braun, G. J. and Fairchild, M. D., "Techniques for Gamut Surface Definition and Visualization", *Proceedings of the Fifth IS&T/SID Color Imaging Conference*, pp. 147-152 (1997).

Stone, M. David, "Color Matching", http://www.extremetech.com/article2/ (assorted w b pages).

Morovic, J. and Luo, M.R., "The Fundamentals of Gamut Mapping: A Survey", *J. Imaging Sci. and Tech.*, pp. 283-290 (2001).

Morovic, Jan, "To Develop a Universal Gamut Mapping Algorithm", Univ. of Derby Ph.D. Thesis (Oct. 1998).

Braun, Gus, "A Paradigm for Color Gamut Mapping of Pictorial Images", Ph.D. Thesis, RIT (1999).

* cited by examiner

*Primary Examiner*—Phuoc Tran
(74) *Attorney, Agent, or Firm*—Fitzpatrick, Cella, Harper & Scinto

(57) ABSTRACT

A color descriptor data structure corresponding to a color device, the color descriptor data structure including a reference color data set corresponding to a reference boundary descriptor representing reference colors of the color device based on measured colors from a reference color target, a plausible color data set corresponding to a plausible boundary descriptor representing plausible colors of the color device which are observable, which encompass at least the reference colors of the reference boundary descriptor, and which include a whitest-white color and a blackest-black color, and a neutral color data set corresponding to neutral colors of the color device, the neutral colors extending in range from the whitest-white color to the blackest-black color.

21 Claims, 9 Drawing Sheets

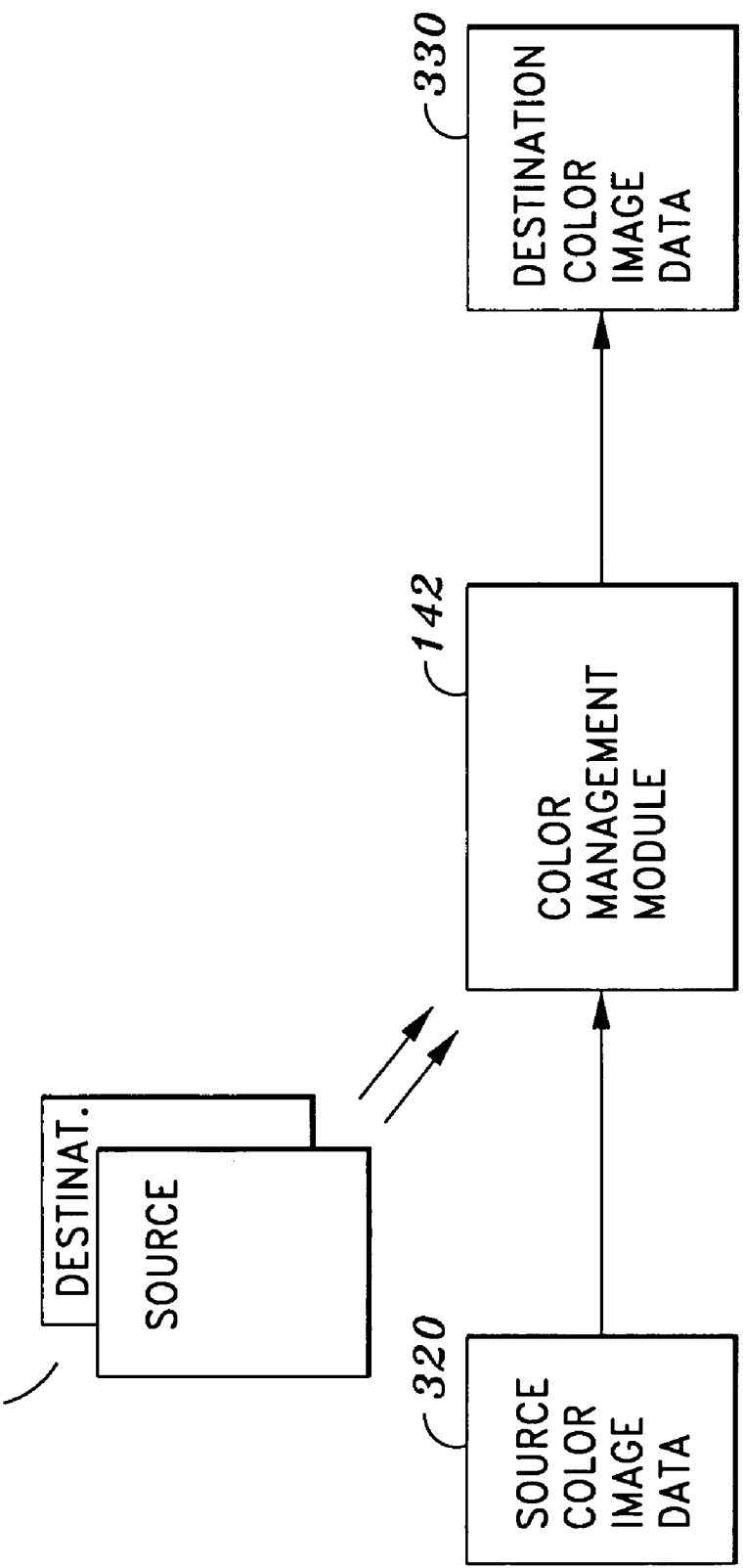

COLOR DESCRIPTOR DATA STRUCTURE

BACKGROUND OF THE INVENTION

1. Field of the Invention

The present invention relates to a color descriptor data structure for a color device, the color descriptor data structure containing a reference boundary descriptor representing reference colors of the color device, a plausible boundary descriptor representing plausible colors of the color device which include a whitest-white color and a blackest-black color, and a neutral color descriptor representing neutral colors of the color device which extend in range from the whitest-white color to the blackest-black color.

2. Description of the Related Art

The use of gamut mapping algorithms in the field of graphic arts is known, and they are used to reproduce an image which was rendered by an input device on an output device, where the input device and the output device typically have different gamut boundaries with respect to each other. In other words, the gamut of colors that can be reasonably reproduced by the input device is typically not the same as the gamut of colors that can be reasonably reproduced by the input device. In such a situation, the gamut boundaries of the two devices are different, and so gamut mapping is used to render the image from within the input device gamut boundary to within the output device gamut boundary, so as to more accurately reproduce the color image on the output device.

Gamut mapping of image data from one gamut boundary to another in the graphic arts field is typically performed using a gamut mapping algorithm which is a particular method of mapping color data between gamut boundaries. In addition, the gamut mapping often uses gamut boundary descriptors for both the input and the output device in order to obtain a reference between the two gamut boundaries for appropriate gamut mapping of the image.

When gamut mapping a rendered picture of an input medium, such as a developed print on photographic paper or a magazine picture, to an output medium on an output device, the white point and the black point of the input medium are typically mapped to the white point and the black point of the output medium. The colors between the white point and the black point of the input medium are then mapped to fall between white point and the black point of the output medium. In the case that the rendered picture on the input medium includes a whitest-white, such as light reflecting off of a chrome bumper or such as a light bulb, and a diffuse white, such as a white shirt, the whitest-white is generally mapped to the white point of the input medium, and the diffuse white is mapped to a neutral color of the input medium which is darker than the medium's white point. In this manner, the range of "whites" of the rendered photograph fall between the white point and the black point of the input medium. In this example, the whitest-white represented at the white point of the input medium is mapped to the white point of the output medium, and the diffuse white at the particular neutral point of the input medium is mapped to a particular neutral point of the output medium. In such a case, the white points and the particular neutral points of the input medium and of the output medium are often not the same.

Gamut mapping becomes more difficult when using an unrendered picture from an input device such as a camera or a video camera. In such cases, the whitest white point of the photographed scene, such as a specular white, an emissive white, or a diffuse white, is not necessarily mapped to the white point of the input medium, such as a photographic film, videotape, or digital media. Neither is the blackest point of the photographed scene necessarily mapped to the black point of the input medium. This present problems when gamut mapping the unrendered picture from the input device, such as a camera, to an output medium in an output device, such as a printer, primarily because it is not known at the time of mapping where the whitest-white points and the black points of the unrendered picture fall on the input medium with respect to the white point and the black point of the input medium.

Input media such as photographic film and digital video provide "headroom" to render portions of the scene falling between "white with detail", such as diffuse white, and "white without detail" such as specular white. Similarly, photographic film and digital video also provide "footroom" to render portions of the scene falling between "black with detail", such as shadow black, and "black without detail", such as blackest-black. In the video industry, a standard encoding is used to represent colors of the scene. Such a standard encoding is the ITU 709 specification in which luminance (Y), which depicts whiteness, is encoded in 8 bits, thereby allowing values between 0 to 255. In this standard, reference black is encoded at a luminance value of 16, and reference white is encoded at a luminance value of 235, thereby leaving the range between 236 and 255 to represent specular highlights and emissive sources.

The video industry is generally based on reference devices and standardized encoding. This means that gamut boundary information of a particular video device is not needed for rendering of an image from the particular video device on another video device because all video images are encoded for reproduction on the same standardized reference device. Unfortunately for the graphic arts industry, when it is desired to reproduce an unrendered image from a particular video device on an output device such as a printer, optimal tonal mapping is difficult, if not impossible. One problem is that the gamut mapping is not provided with information about the location of whitest-white and diffuse white with respect to the white point of the input medium, and is not provided with information about the location of blackest-black and shadow black with respect to the black point of the input medium. Neither is the gamut mapping provided with information about the location of various tonal gray points falling between blackest-black and whitest-white on the input medium In addition to the above-mentioned problems with gamut mapping during the reproduction of unrendered photographic and video images onto an output device with a different gamut boundary, photographic and video devices produce gray colors which do not necessarily fall on the neutral axis of the color appearance model in which can be used to depict the color gamut of the photograph and/or video device. A typical color appearance model is in CIECAM02 JCh color space, and so gray colors of the photograph and/or video device may not necessarily fall on the J axis, where chroma (C) has a zero value. This representation of gray colors in the color appearance model for photographic and/or video devices is very problematic for gamut mapping algorithms which expect gray colors to fall directly on the J axis, where chroma (C) has a zero value.

Accordingly, it is desirable to find a solution to one or more of the foregoing problems. In particular, it is desirable to be able to adequately describe the range of colors of a source input device that fall between reference colors, such as diffuse white, and plausible colors, such as whitest-white, of the source input device, and to adequately describe the location of the gray colors of the source input device.

SUMMARY OF THE INVENTION

The present invention addresses one or more of the foregoing problems by providing a color descriptor data structure for a color device, wherein the color descriptor data structure contains a reference boundary descriptor representing reference colors of the color device, a plausible boundary descriptor representing plausible colors of the color device which include a whitest-white color and a blackest-black color, and a neutral color descriptor representing neutral colors of the color device which extend in range from the whitest-white color to the blackest-black color. In this manner, the color descriptor data structure of the present invention can be used to describe the color characteristics of a device such as a camera or a video camera so that an unrendered image from such a device can be appropriately gamut mapped to an output medium on an output device, such as a printer, for a proper reproduction of the unrendered image on the output medium. The color descriptor data structure can also describe the color characteristics of other devices to also support the gamut mapping of rendered images to an output medium of an output device.

In one aspect, the invention is directed to a color descriptor data structure corresponding to a color device, the color descriptor data structure including a reference color data set corresponding to a reference boundary descriptor representing reference colors of the color device based on measured colors from a reference color target, a plausible color data set corresponding to a plausible boundary descriptor representing plausible colors of the color device which are observable, which encompass at least the reference colors of the reference boundary descriptor, and which include a whitest-white color and a blackest-black color, and a neutral color data set corresponding to neutral colors of the color device, the neutral colors extending in range from the whitest-white color to the blackest-black color.

Preferably, the reference color target on which the reference colors of the color device are based is a standardized and readily-reproducible color target. In addition, the reference color data set and the plausible color data set preferably represent respective three-dimensional surfaces in color appearance space. Also, the neutral color data set preferably represents a spline in color appearance space. The plausible color data set is preferably derived by extrapolating color data from a mathematical color model representing the color device.

In this manner, the present invention is used to describe the color characteristics of a device such as a camera or a video camera so that an unrendered image from such a device can be appropriately gamut mapped to an output medium on an output device, such as a printer, for a proper reproduction of the unrendered image on the output medium. The color descriptor data structure of the present invention can also be used to describe the color characteristics of other color devices in order to support the gamut mapping of rendered images from such other devices to an output medium of an output device.

In another aspect, the invention is directed to a method for generating a color descriptor data structure corresponding to a color device, wherein the method includes the steps of generating a reference color data set corresponding to a reference boundary descriptor representing reference colors of the color device based on measured colors from a reference color target, generating a plausible color data set corresponding to a plausible boundary descriptor representing plausible colors of the color device which are observable, which encompass at least the reference colors of the reference boundary descriptor, and which include a whitest-white color and a blackest-black color, generating a neutral color data set corresponding to neutral colors of the color device, the neutral colors extending in range from the whitest-white color to the blackest-black color, and adding the reference color data set, the plausible color data set and the neutral color data set in the color descriptor data structure.

Preferably, the reference color target on which the reference colors of the color device are based is a standardized and readily-reproducible color target. Typically, the reference color target will contain colors that fall inside the color gamut and are thus not part of the reference color data set. In addition, the reference color data set and the plausible color data set are preferably generated to represent respective three-dimensional surfaces in a color appearance space. Also, the neutral color data set is preferably generated to represent a spline in the color appearance space. The plausible color data set is preferably generated by extrapolating color data from a mathematical color model representing the color device, and the mathematical color model is based on the measured color values from the reference color target.

In this manner, the present invention is used to create a color descriptor data structure that can be used by a gamut mapping algorithm, where the color descriptor data structure describes the color characteristics of a device such as a camera or a video camera so that an unrendered image from such a device can be appropriately gamut mapped to an output medium on an output device, such as a printer, for a proper reproduction of the unrendered image on the output medium. The generated color descriptor data structure of the present invention can also be used to describe the color characteristics of other color devices in order to support the gamut mapping of rendered images from such other devices to an output medium of an output device.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 6 is a diagram which depicts a color management process using a color descriptor data structure according to one embodiment of the invention.

DETAILED DESCRIPTION OF THE PREFERRED EMBODIMENTS

The present invention provides a color descriptor data structure for a color device which contains a reference boundary descriptor representing reference colors of the color device, a plausible boundary descriptor representing plausible colors of the color device which include a whitest-white color and a blackest-black color, and a neutral color descriptor representing neutral colors of the color device which extend in range from the whitest-white color to the blackest-black color. According to the present invention, the color descriptor data structure can be used to appropriately gamut map an unrendered image, such as a photographic or video image, to an output medium on an output device, such as a printer, so that reproduction of the range of colors from the whitest-white to the blackest-black on the output medium is made possible.

Figure 1:
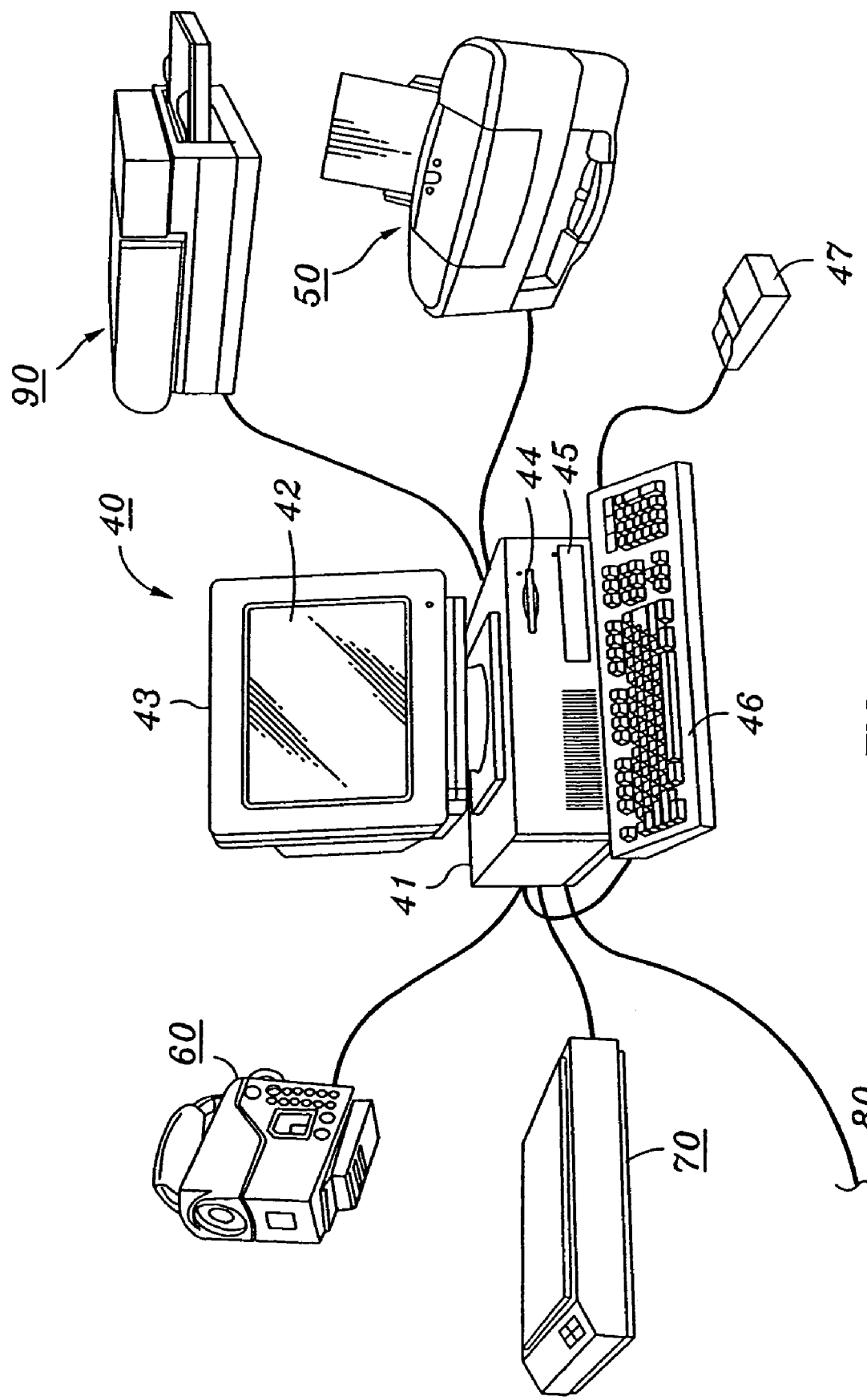
FIG. 1 is a representative view of a computing environment in which the present invention may be implemented according to one embodiment of the invention.

Turning to FIG. 1, a computing environment is shown in which the present invention may be implemented. FIG. 1 depicts a representative computing system including computing equipment, peripherals and digital devices which may be used in connection with the practicing the present invention. Computing equipment 40 includes host processor 41 which comprises a personal computer (hereinafter "PC"), preferably an IBM PC-compatible computer having a windowing environment such as Microsoft Windows 98, Windows 2000, Windows Me, Windows XP, or Windows NT, or other windowing system such as LINUX. In the alternative, host processor 41 may be an Apple computer or other non-windows based computer. Computing equipment 40 includes color monitor 43 including display screen 42, keyboard 46 for entering text data and user commands, and pointing device 47. Pointing device 47 preferably comprises a mouse for pointing and for manipulating objects displayed on display screen 42.

Computing equipment 40 also includes computer-readable memory media such as computer fixed disk 45 and floppy disk drive 44. Floppy disk drive 44 provides a means whereby computing equipment 40 can access information, such as image data, computer-executable process steps, application programs, etc. stored on removable memory media. In the alternative, information can also be retrieved through other means such as a USB storage device connected to a USB port (not shown), or through network interface 80. Also, a CD-ROM drive and/or a DVD drive (not shown) may be included so that computing equipment 40 can access information stored on removable CD-ROM and DVD media.

Printer 50 is a first printer, preferably a color bubble jet printer, which forms color images on a recording medium such as paper or transparencies or the like. Printer 90 is a second printer, preferably an color laser printer, which also forms color images on a recording medium such as paper or transparencies or the like. Preferably, printer 50 and printer 90 form color images using cyan, magenta, yellow and black inks, although the present invention can be used with printers and devices which use other colorant combinations that include black. The invention is also usable with other printers that use such colorant combinations, so long as the printer is capable of being interfaced to computing equipment 40. In addition, digital color scanner 70 is provided for scanning documents and images and sending the corresponding image data to computing equipment 40. Digital color camera 60 is provided for sending digital image data to computing equipment 40. Of course, computing equipment 40 may acquire digital image data from other sources such as a digital video camera, a local area network or the Internet via network interface 80.

Figure 2:
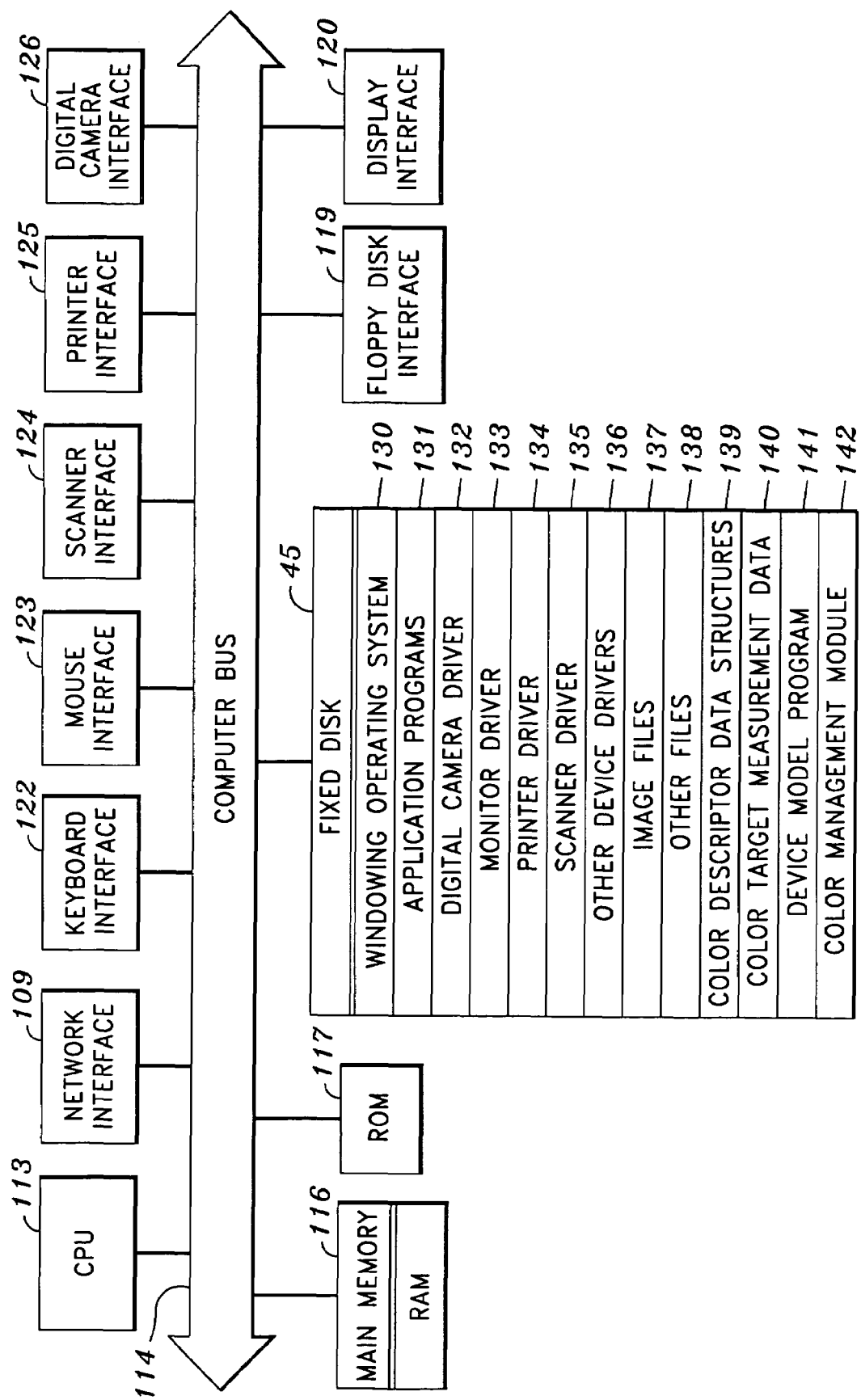
FIG. 2 is a detailed block diagram depicting the internal architecture of the computing device shown in FIG. 1 according to one embodiment of the invention.

FIG. 2 is a detailed block diagram showing the internal architecture of host processor 41 of computing equipment 40. As shown in FIG. 2, host processor 41 includes central processing unit (CPU) 113 which interfaces with computer bus 114. Also interfacing with computer bus 114 are fixed disk 45, network interface 109, random access memory (RAM) 116 for use as a main run-time transient memory, read only memory (ROM) 117, floppy disk interface 119, display interface 120 for monitor 43, keyboard interface 122 for keyboard 46, mouse interface 123 for pointing device 47, scanner interface 124 for scanner 70, printer interface 125 for printers 50 and 90, and digital camera interface 126 for digital camera 60.

RAM 116 interfaces with computer bus 114 so as to provide information stored in RAM 116 to CPU 113 during execution of software programs such as an operating system, application programs, such as color management module 142, and device drivers. More specifically, CPU 113 first loads computer-executable process steps from fixed disk 45, or another storage device into a region of RAM 116. CPU 113 can then execute the stored process steps from RAM 116 in order to execute the loaded computer-executable process steps. Data such as color images or other information can be stored in RAM 116, so that the data can be accessed by CPU 113 during the execution of computer-executable process steps need to access and/or modify the data.

As also shown in FIG. 2, fixed disk 45 contains operating system 130, which is preferably a windowing operating system although other operating systems may be used, application programs 131, such as a word processing program or a graphic image management program. Fixed disk 45 also contains digital camera driver 132, monitor driver 133, printer driver 134, scanner driver 135, and other device drivers 136. Fixed disk 45 also includes image files 137, other files 138, color descriptor data structures 139 for implementing the present invention as described further herein, color target measurement data 140 which represents color image data obtained from a color target, device model program 141 which is used to generate color characteristics of color device, and color management module 142 which is used to render source image color data for reproduction on a destination output device, such as printer 50. Color descriptor data structures 139 of the present invention are preferably generated by computer-executable process steps which are stored on fixed disk 45 for execution by CPU 113, such as in one of application programs 131 or in color management module (CMM) 142. The process steps for generating color descriptor data structures 139 of the present invention are described in more detail below.

Figure 3:
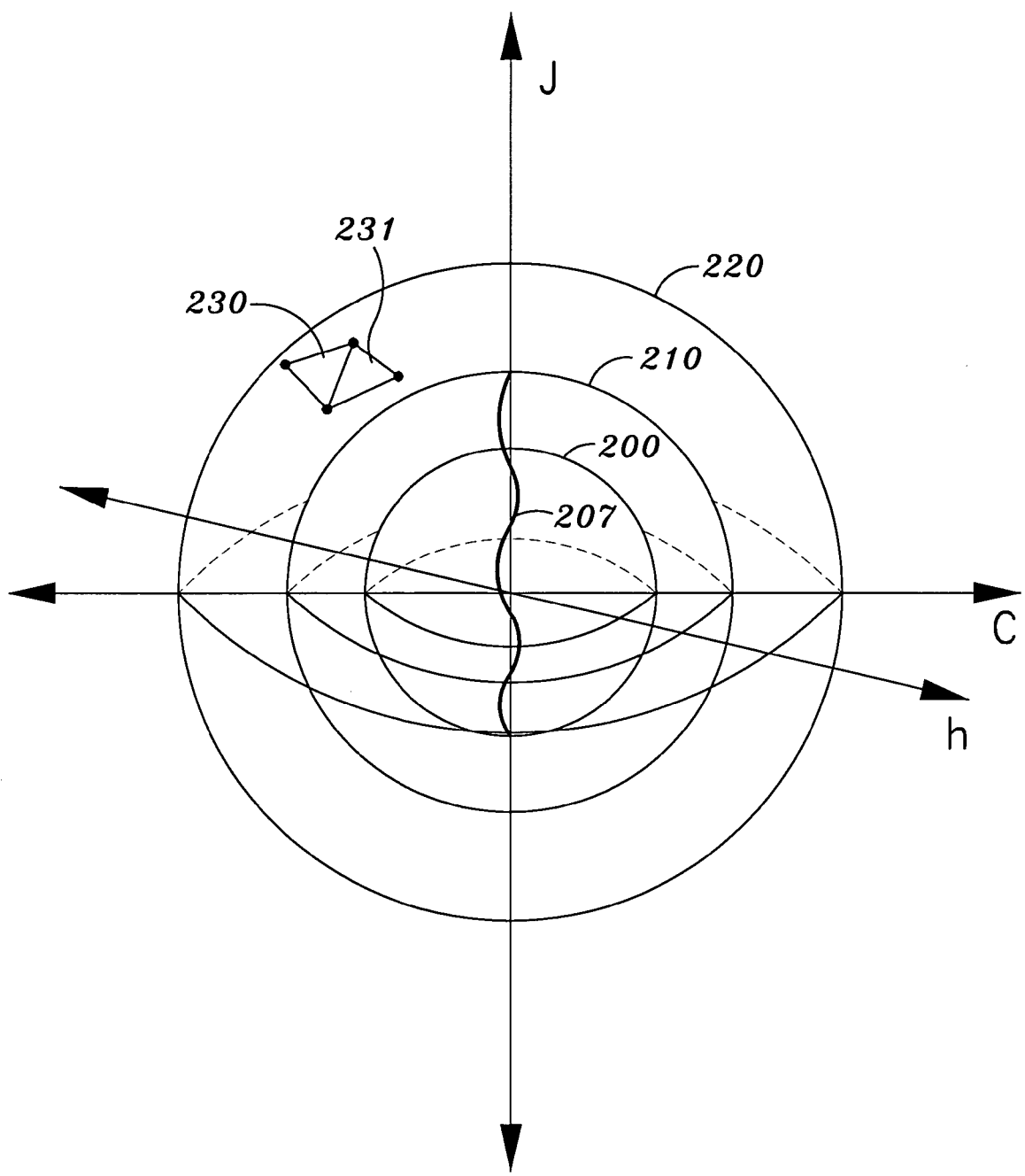
FIG. 3 is a diagram which depicts the boundary regions for a color device in three-dimensions according to one embodiment of the invention.

FIG. 3 is a three-dimensional depiction of three color boundary descriptor regions corresponding to a color device as represented by respective color boundary descriptor shells provided in a color descriptor data structure according to the present invention. As seen in FIG. 3, the outer shell of each color boundary descriptor region is represented by a three-dimensional convex shell in JCh color space. The innermost color boundary descriptor region shown in the example of FIG. 3 is reference boundary descriptor region 200, which represents the reference colors of the color device which are based on measured colors from a reference color target. For example, when obtaining measurement data for output devices, such as printers, a user prints a test target from the printer wherein the test target contains color patches that cover the gamut of colors that the device can produce. In such a case, control values in CMYK color space for the range of 0 to 255 are input to the printer and the range of colors that the printer is capable of producing are output onto the test target. Then, the output test target is measured with a colorimeter or a spectrometer to obtain output color measurements.

A profiling tool can then be used to create a color device file containing the control values and the output values. A device manufacturer may perform this process and then provide the color device file to purchasers and users of its color devices. It should be appreciated that for output devices, such as printers, the reference boundary region described by the output colors on the measured test target is the same as the plausible boundary region of colors that can be produced by the color device. The possible boundary region described by the full range of control values may be larger than the reference boundary region if the encoding scheme being used contains headroom and footroom color values that are beyond the range of colors that the color device can produce. For example, if the 8-bit CMYK encoding space is used then the range of possible colors in the encoding space is usually around the same as the range of reference colors that were output by the color device. However, if a larger 16-bit scRGB encoding scheme is used, then the range of possible colors in the encoding space is usually much larger than the range of reference colors that were output by the color device.

When obtaining measurement color data for input devices, a pre-printed standardized target is generally used, such as an IT8-7.2 target, a MacBeth ColorChecker target, or a ColorCheckerDC target. The IT8 target contains approximately 260 color patches printed on photographic paper, and the ColorChecker is a physical target containing dyed color patches. Control measurement data for the pre-printed standardized target is usually provided by the manufacturer of the target. The user then uses the input device, such as a camera, to capture the color patches on the pre-printed standardized target. The color data for the captured target provides the device color values corresponding to the control measurement values of the target. A profiling tool can then be used to create a color device file containing the control measurement values and the captured device values. The pre-printed standardized target typically does not have color patches which cover the entire range of colors that the input device can produce. For this reason, the reference boundary region which represents the captured color values is usually smaller than the plausible boundary region which represents the range of colors that the device can produce. If the input color device is characterized based only on the narrow range of measured reference color values from the captured color target, then it would be difficult to manage colors from the input color device that are outside the narrow range of measured reference colors but still within the range of colors that can plausibly be produced by the color device.

In this regard, the color descriptor data structure of the present invention also includes plausible color descriptor data corresponding to the plausible colors which can be reasonably reproduced by the color device. Plausible boundary descriptor region 210 represents the region described by the plausible color descriptor data. By definition, plausible boundary descriptor region 210 includes at least the colors of reference boundary descriptor region 200. Accordingly, as described above, the colors which can be reproduced by the color device but which are outside the range of measured reference colors from the device's reference color target will fall between reference boundary descriptor region 200 and plausible boundary descriptor region 210.

The outermost boundary descriptor region is possible boundary descriptor region 220 which corresponds to the full range of color values that are described by the color encoding scheme being used. Accordingly, possible boundary descriptor region 220 will usually include colors beyond the range of colors that can be reasonably reproduced by the color device. For example, a new IEC standard color encoding scheme known as "scRGB", (IEC 61966-2-2), provides sixteen (16) bits for each of the three color channels red, green, and blue (RGB). In that encoding scheme, reference black is not encoded as the RGB triple (0, 0, 0), but as (4096, 4096, 4096), and the reference white is encoded as (12288, 12288, 12288). Therefore, the scRGB encoding scheme contains a lot of unused headroom and footroom since the maximum value of the 16 bit range is (65,535, 65,535, 65,535). This can be used to represent specular highlights and shadow detail beyond the reference white and reference black of the scheme. The range of color values of the scRGB encoding scheme includes RGB triples that are not physically possible because they would require negative amounts of light. Accordingly, no device can possibly produce all the colors in the scRGB color gamut. The present invention uses plausible boundary descriptor region 210 to utilize the additional headroom and footroom of the color encoding scheme to describe this colors which can be reproduced by the color device but which are not within the range of the color device's reference colors of reference boundary descriptor region 200.

Because possible boundary descriptor region 220 represents the full range of the encoding scheme, it necessarily includes the colors of plausible boundary descriptor region 210 and the colors of reference boundary descriptor region 207. It should be appreciated that there are circumstances when the three boundary descriptor regions described above will be collapsed on top of each other. For example, when the full range of values of the encoding scheme is utilized to depict the full range of colors that can be reproduced by the color device, then possible boundary descriptor region 220 will collapse onto plausible boundary descriptor region 210. Similarly, when the measured reference color values include the full range of colors that can be reproduced by the color device, then plausible boundary descriptor region 210 will collapse onto reference boundary descriptor region 200. Possible boundary descriptor region 220 can be represented by possible boundary descriptor data optionally included in a color descriptor data structure according to the invention. The inclusion of the possible boundary descriptor data is optional because the range of values of the particular color encoding scheme in use is generally known when performing color management of color image data.

Also included in FIG. 3 is neutral color tone spline 207 which represents the neutral gray colors of the color device. It should be noted that neutral color tone spline 207 does not have to be a straight line because the neutral gray colors of the color device do not necessarily fall on the J axis in the color appearance space, where chroma (C) is equal to zero. Neutral color tone spline 207 is based on neutral color data in the color descriptor data structure, which preferably includes data representing at least five colors which are: (1) the whitest-white color that the color device can produce, corresponding to a specular highlight in an image; (2) a reference white color producible by the color device, corresponding to a diffuse white color in an image; (3) a neutral mid-gray color producible by the color device, corresponding to a mid-tone gray color in an image; (4) a reference black color that the color device can produce, corresponding to a shadow black in an image; and (5) the blackest-black color that the color device can produce, corresponding to a completely black color without detail in an image. In this manner, the neutral color data provided in the color descriptor data structure allows color image data to be correctly mapped to the neutral gray tone spline of an output device, thereby resulting in an appropriate tonal appearance of the output image from the output device.

As mentioned above, each boundary descriptor region shown in FIG. 3 is represented as a three-dimensional convex shell in JCh color space. The boundary descriptor data for each boundary descriptor region contained in the color descriptor data structure according to the present invention therefore is arranged to collectively represent a three-dimensional convex shell. There are many known methods for arranging data to depict three-dimensional surfaces. In one embodiment of the invention, the data is arranged in vertex sets wherein each vertex set represents a two-dimensional polygon surface, such as a triangle. As seen in FIG. 3, two-dimensional triangles 230 and 231 each of which is defined by a set of three vertices. Accordingly, in this embodiment, the boundary descriptor data contained in the color descriptor data structure is arranged in sets of three vertices, where each vertex is described by a JCh value in color appearance space. The format of the boundary descriptor data of this embodiment is described more fully below with reference to FIG. 5B.

Figure 4:
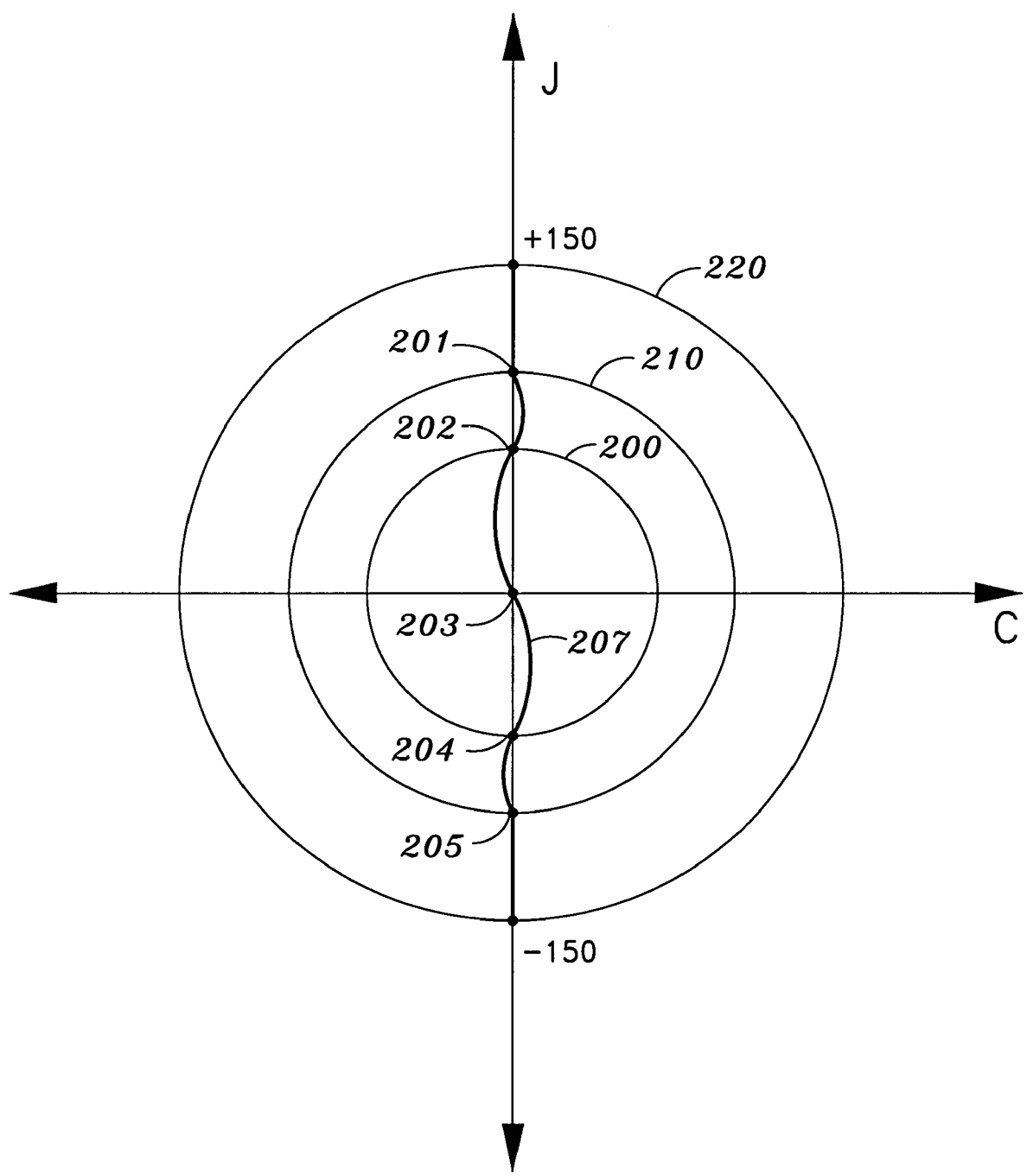
FIG. 4 is a diagram which depicts the boundary regions for a color device in two-dimensions according to one embodiment of the invention.

Turning to FIG. 4, a two-dimensional cross-section is shown of the boundary descriptor regions depicted in FIG. 3. As seen in FIG. 4, cross-sections of reference boundary descriptor region 200, plausible boundary descriptor region 210, and possible boundary descriptor region 220 are represented, as well as neutral color tone spline 207. The boundary descriptor regions of the present invention allow the color characteristics of a color device to be depicted in color appearance space beyond the range allowed by the conventions of a standardized reference color profile. For example, neutral color tone spline 207 can be shifted so that plausible boundary descriptor region 210 includes colors with lightness (J) values above the value of 100, such as specular highlights of an image, and below 0, such as black without detail. As depicted in FIG. 4, neutral color tone spline 207 is defined by the five neutral color points described above. Specifically, neutral color tone spline 207 includes whitest-white color 201, reference white color 202, neutral mid-gray color 203, reference black color 204, and blackest-black color 205. These neutral color points correspond to neutral color data provided in the color descriptor data structure of the present invention.

The color space disposed between whitest-white color 201 and reference white color 202 includes image colors that range between diffuse white and specular white. Similarly, the color space disposed between reference black color 204 and blackest-black color 205 includes image colors that range between shadow black and black without detail. The use of these interim spaces between the aforementioned neutral gray color points allows the specular highlights and shadow blacks to be preserved when mapping the image color data to the color space and gamut of an output medium. These interim spaces between the neutral gray colors can vary depending on the characterization of the color device as represented by reference boundary descriptor region 200 and plausible boundary descriptor region 210. For instance, if plausible boundary descriptor region 210 is collapsed onto reference boundary descriptor region 200, which is the case when the reference color data contains the full range of colors that can be produced by the color device, then whitest-white color 201 and reference white color 202 can be co-located on the same point in color space, and reference black color 204 and blackest-black color 205 can be co-located on the same point in color space. In such a situation, mapping of color image data using the boundary descriptor regions would result in the loss of specular highlights between diffuse white and specular white, and the loss of shadow blacks between black with detail and black without detail.

Of course, the present invention allows for flexibility in the characterization of a color device because the neutral color data provided in the color descriptor data structure corresponding to the color device can be manipulated to modify the shape and placement of neutral color tone spline 207 in the color appearance space. So, even in the above example where plausible boundary descriptor region 210 is collapsed onto reference boundary descriptor region 200, the position of reference white color 202 can be moved down the J axis to provide separation from whitest-white color 201, and the position of reference black color 204 can be moved up the J axis to provide separation from blackest-black color 205. This ability to manipulate the neutral color data in the color descriptor data structure for the color device allows a user or developer to control the mapping of color image data so as to preserve image colors, such as specular highlights and shadow blacks, when the color image data is reproduced on an output medium, such as printer paper in a color printer. Accordingly, the present invention has the advantage over conventional, predetermined color profile formats in which generally do not provide a readily-usable distinction between reference colors for a color device and the full range of colors that a device can plausibly reproduce, and which do not allow for convenient identification and manipulation of the gray color points for the color device.

Figure 5A:
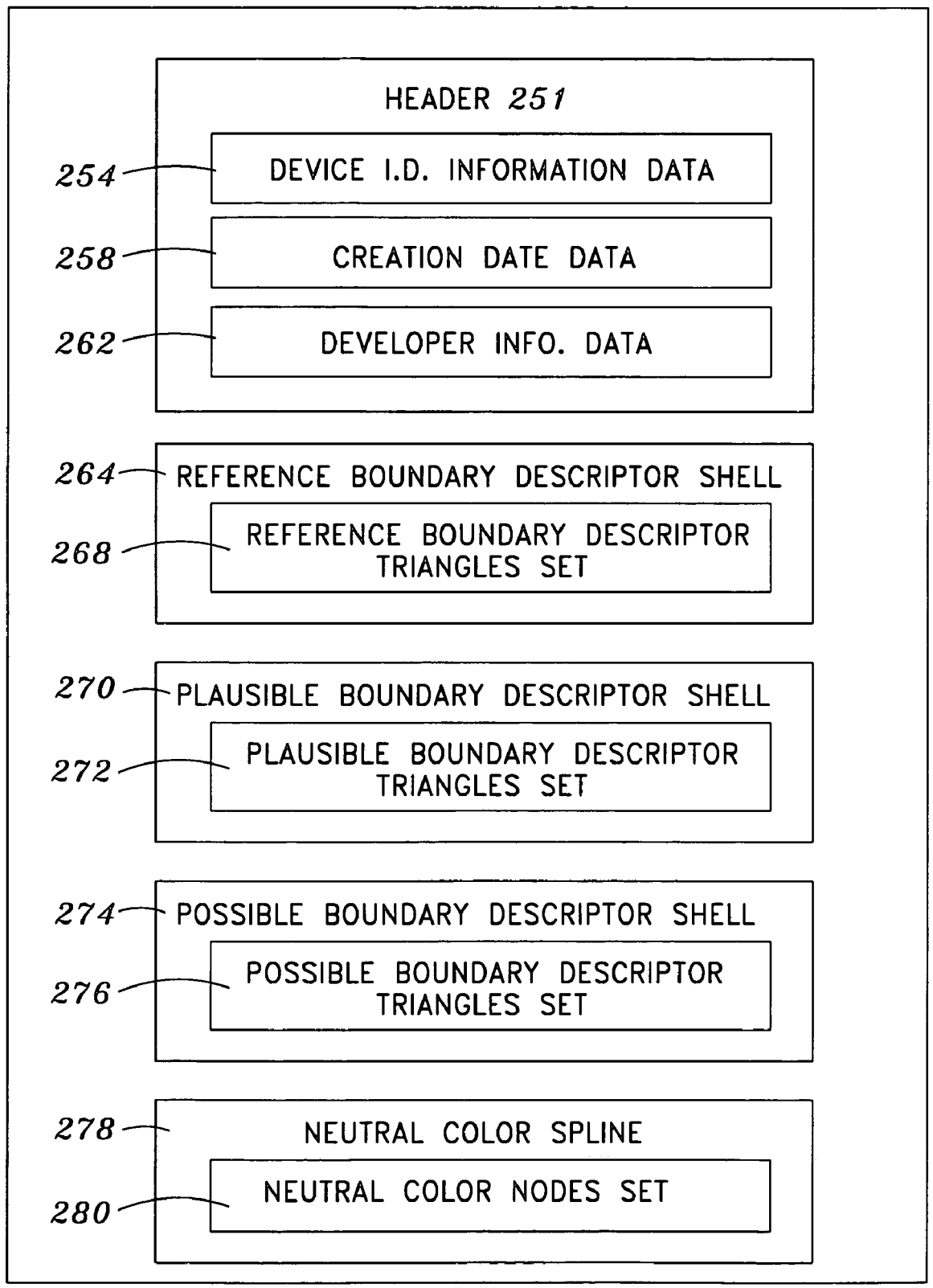
FIG. 5A is a diagram which depicts a color descriptor data structure according to one embodiment of the invention.

FIG. 5A represents an example of one of color descriptor data structures 139 according to the present invention. As seen in FIG. 5, color descriptor data structure 250 includes a variety data structures, most of which are used to describe the outer surface of each boundary descriptor region corresponding to the color device. Specifically, color descriptor data structure 250 includes header 251 which contains data representing identification of the corresponding color device, as well as information regarding the creation of color descriptor data structure 250. In particular, header 251 includes within it device i.d. information data 254 which represents an identifier for the corresponding color device, such as the device manufacturer and/or model name, or other such identifying information. Creation date data 258 is also provided in header 251 and represents the date on which the information in color descriptor data structure 250 was created or last modified, thereby allowing a user to know if color descriptor data structure 250 reflects the current color characteristics of the corresponding color device. Developer information data 262 is provided in header 251 and represents the identity of the person or entity which prepared and developed color descriptor data structure 250.

Also included in color descriptor data structure 250 are reference boundary descriptor shell 264, plausible boundary descriptor shell 270, possible boundary descriptor shell 274, and neutral color spline 278. Each of the aforementioned boundary descriptor shells in color descriptor data structure 250 represents a corresponding boundary descriptor region outer shell depicted in FIG. 3. In this regard, each boundary descriptor shell is comprised of many two-dimensional polygon triangle surfaces. So, as seen in FIG. 5A, reference boundary descriptor shell 264 includes reference boundary descriptor triangles set 268, plausible boundary descriptor shell 270 includes plausible boundary descriptor triangles set 272, and possible boundary descriptor shell 274 includes possible boundary descriptor triangles set 276. Each of the aforementioned triangles sets contain multiple vertex sets that are used to define the triangles of the outer shell of the respective boundary descriptor. Also included in color descriptor data structure 250 is neutral color spline 278 which includes neutral color nodes set 280. Neutral color nodes set 280 includes multiple data points in color appearance space representing neutral gray colors of the corresponding color device, ranging from the whitest-white color to the blackest-black color that can be produced by the device. Preferably, the neutral gray colors represented by neutral color nodes set 280 includes the five neutral gray colors of a whitest-white color, a reference-white color, a mid-tone gray color, a reference-black color, and a blackest-black color In this manner, neutral color nodes set 280 is used in the present invention to depict neutral color tone spline 207 as described above with respect to FIGS. 3 and 4. Accordingly, color descriptor data structure 250 contains the necessary information to describe the three boundary descriptor regions of the corresponding color device, as well as the spline of neutral gray colors of the color device. The aforementioned boundary descriptor regions and neutral gray spline are then used to properly map to and from the color space and color gamut of corresponding color device during a color management process.

Figure 5B:
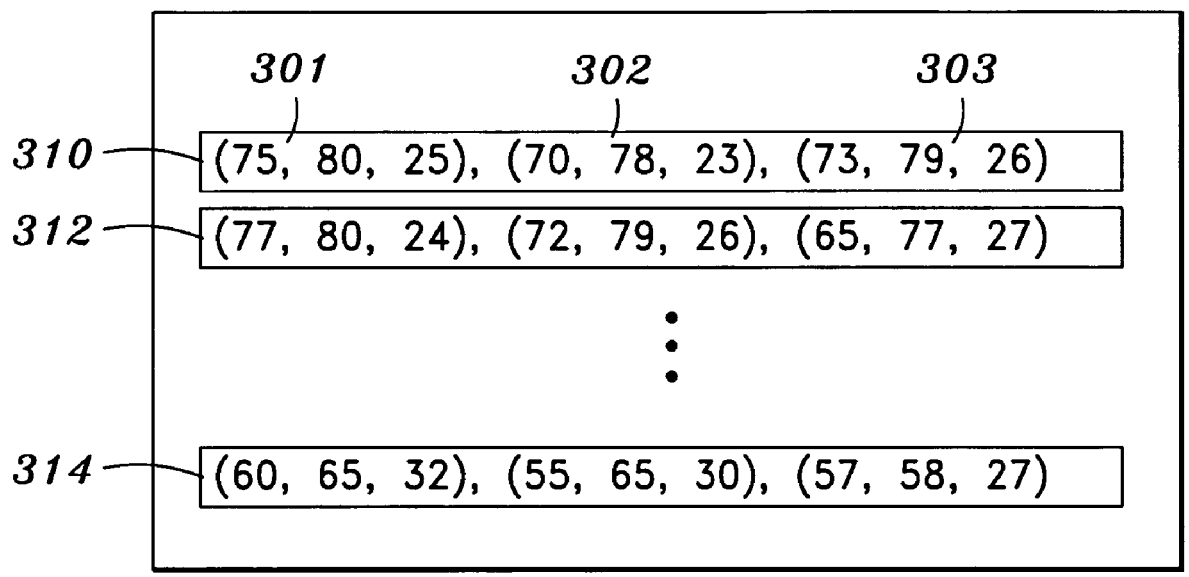
FIG. 5B is a diagram which depicts a data format for the color descriptor data structure according to one embodiment of the invention.

FIG. 5B depicts a format for boundary descriptor triangles sets 268, 272 and 276 in color descriptor data structure 250 of FIG. 5A, which combine to form the outer shell of each of the boundary descriptor regions of the corresponding color device. As discussed above, the low-level data for representing the outer shell of each boundary descriptor region is preferably formatted into many vertex sets, wherein each vertex set contains color appearance space values for three vertices, thereby representing a two-dimensional polygon surface, which in this case is a triangle. In this manner, all vertex sets of a boundary descriptor triangles set are combined to represent a mosaic-like, three-dimensional convex hull surface of the corresponding boundary descriptor region. Returning to FIG. 5B, it can be seen that the data of boundary descriptor triangles set 300 is arranged into a series of vertex sets 310 to 314, each vertex set containing color appearance space (JCh) values for three vertices 301 to 303. For example, as seen in vertex set 310, vertex 301 contains a "J" value of 75, a "C" value of 80, and an "h" value of 25. These three values define a particular vertex point in JCh color appearance space, such as one of the three vertex points of two-dimensional triangle 230 in FIG. 3. Accordingly, each of vertex sets 310 to 314 represents a two-dimensional triangle which is a piece of the overall three-dimensional convex hull surface of the corresponding boundary descriptor region, such as plausible boundary descriptor region 210 in FIG. 3.

Of course, it can be appreciated that there are many known methods for representing a three-dimensional surface, and that the present invention may use such methods in the alternative without departing from the functionality and spirit of the invention. For example, the boundary descriptor triangles sets of each shell in color descriptor data structure 250 can be formatted so that they represent indexed triangles in which all vertices are stored along with the connection lines between vertices. Another method would be to format the data in the boundary descriptor triangles sets to represent triangle strips, which when combined represent the three-dimensional surface of the corresponding boundary descriptor region. As mentioned above, neutral color nodes set 280 is simply a collection of vertex points which represent the neutral gray colors of neutral color tone spline 207. Accordingly, a user or developer can easily access the neutral gray colors of neutral color nodes set 280 in color descriptor data structure 250, in order to identify and even modify the range of tones that are used to characterize the corresponding color device by changing the values for the neutral colors in neutral color nodes set 280. Preferably, each set of JCh values in neutral color nodes set 280 has a corresponding set of semantic data, such as a character string which contains the name of the specific neutral gray color. The semantic data can then be easily identified by a user or developer when accessing neutral color nodes set 280, so that the user or developer can more easily read the color appearance space values for each neutral gray color and modify the values if desired.

FIG. 6 depicts a color management process using color descriptor data structures 139 of the present invention. As seen in FIG. 6, color management module 142 accesses two of color descriptor data structures 139 corresponding to a source color device which generated source color image data 320, and to a destination color device which will reproduce the color image data on an output medium. In particular, color management module 142 preferably accesses color descriptor data structures 139 and retrieves the descriptor data for the boundary descriptor regions and neutral color tone splines of each device. Color management module 142 then preferably uses this information to derive matrices and look-up tables to properly map the colors of source color image data into the desired areas of the boundary descriptor regions and neutral color tone spline of the destination color device, thereby generating destination color image data 330. Accordingly, color descriptor data structures 139 of the present invention can be used to achieve a more accurate and desirable reproduction of color image data.

Figure 7:
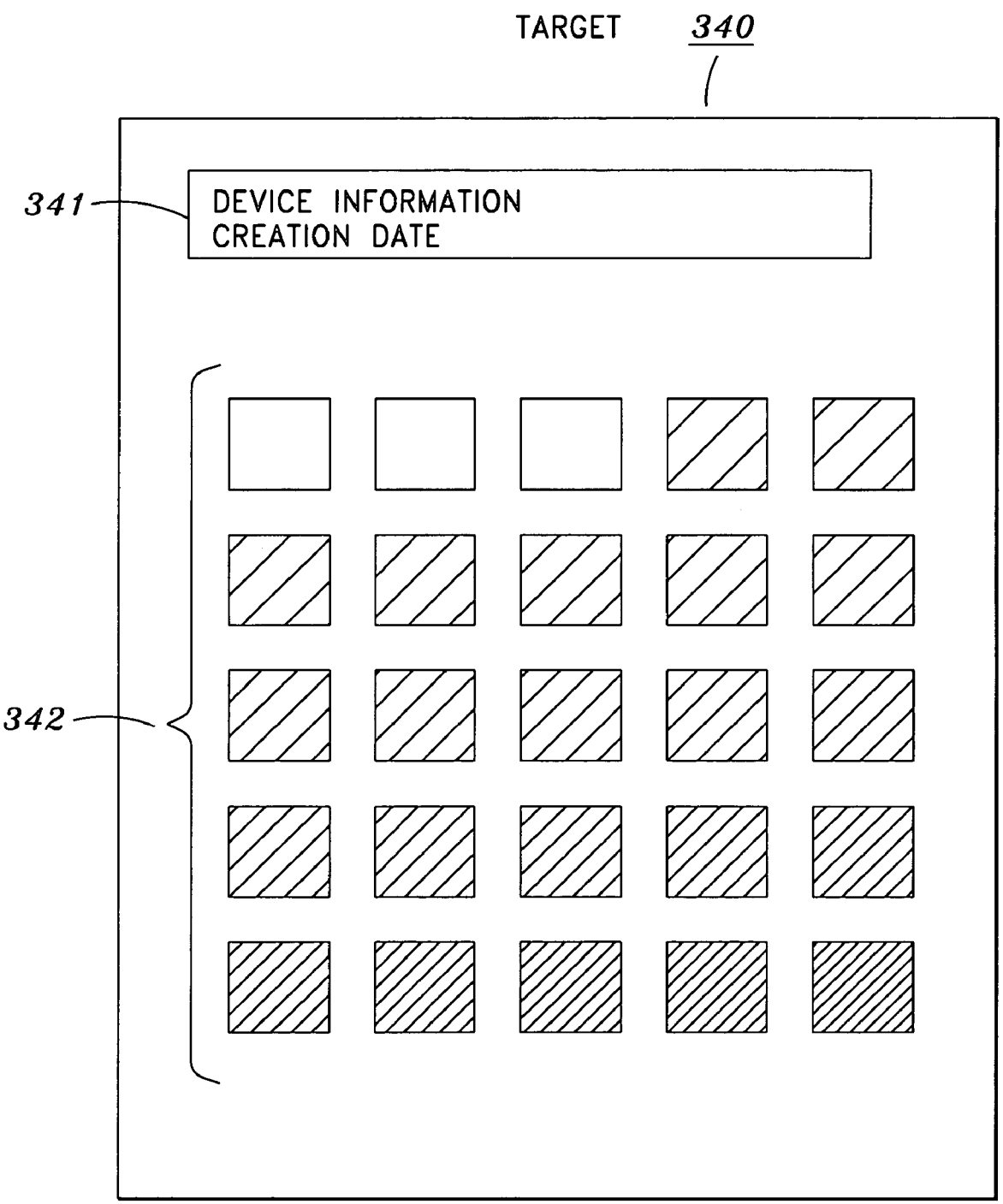
FIG. 7 is a diagram for depicting a color target reference used to create a color descriptor data structure according to one embodiment of the invention.

FIG. 7 depicts a standardized, pre-printed reference color target used to obtain measured reference color data which can be used to create reference boundary descriptor triangles set 268 for an input color device according to one embodiment of the invention. As seen in FIG. 7, target 340 is a provided on a printed medium, such as photographic paper, although other types of media, such as transparencies can be used as well. Target 340 contains information field 341 and color patch field 342. Preferably, target 340 is a predetermined, standardized color target. For example, target 340 can be formatted according to an IT8-7.2 standard target, a MacBeth ColorChecker standard target, or a ColorCheckerDC standard target. Information field 341 preferably contains data corresponding to device information regarding the device which generated the color target, such as target type and manufacturer, as well as information for the creation date of target 340. Color patch field 342 of target 340 contains a range of color patches representing standard reference colors. As mentioned above, the reference colors represented by the color patches typically do not include the full range of colors that the input color device capturing the target is capable of producing. Target 340 is captured to obtain measured reference color values corresponding to each of the color patches in color patch field 342 which can then be used to generate reference boundary descriptor triangles set 268 for placement in a color descriptor data structure for the input color device.

Figure 8:
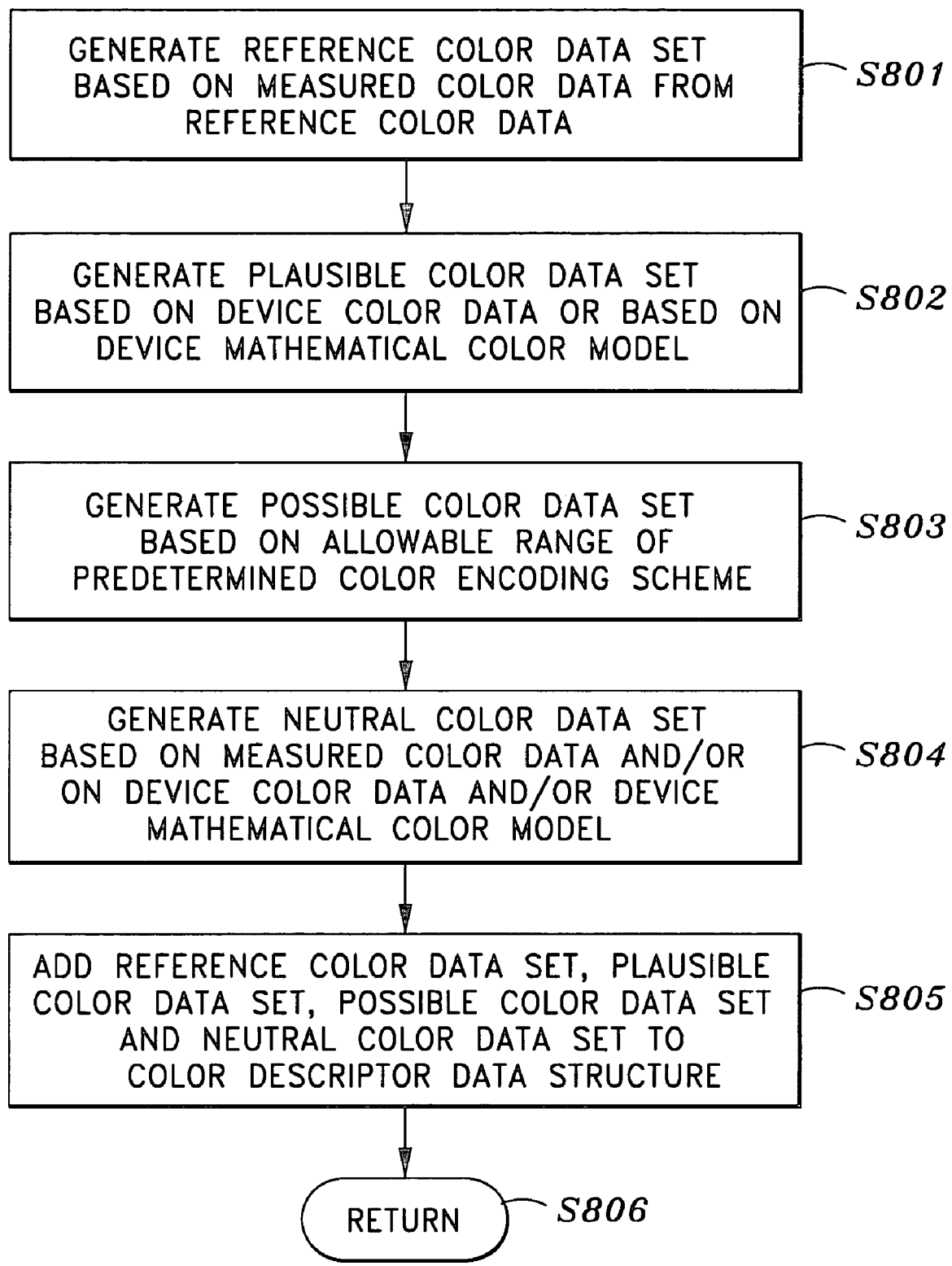
FIG. 8 is a flow chart for explaining a process to create a color descriptor data structure according to one embodiment of the invention.

FIG. 8 is a flowchart for describing the process of creating a color descriptor data structure according to one embodiment of the present invention. In step S801, a reference color data set is generated based on measured reference color data from a reference color target. For example, the measured reference color data can be obtained from a manufacturer of a color device where the manufacturer has scanned a reference color target corresponding to the color device to generate the measured reference color data. In the alternative, the measured reference color data can be obtained directly by obtaining the reference color target and then scanning it. In another alternative, the measured reference color data can be obtained from a mathematical model of the color device, such as device model program 141 which is configured to predict the color characteristics of the color device.

Next, in step S802, a plausible color data set is generated based on device color data obtained from the manufacturer of the color device, where the device color data represents the range of colors that can be reproduced by the color device. In the alternative, the plausible color data set can be generated based on a mathematical model corresponding to the color device such as device model program 141 which is configured to predict the full range of color characteristics of the color device. For example, device model program 141 can be configured based on the measured reference color data, and then extrapolates to generate the full range of colors that can be reproduced by the color device. In step S803, a possible color data set is generated based on the complete allowable range of the predetermined encoding scheme being used to represent color data. For example, if an 8-bit RGB encoding scheme is being used, then the range of all colors represented by the RGB values from (0, 0, 0) to (255, 255, 255) are used and translated into JCh color appearance to generate the possible color data set.

In step S804, neutral color data set is generated based on one or more of the measured reference color data, the device color data obtained from the manufacturer, or a mathematical device color model, such as device model program 141. Specifically, values for the device's neutral gray colors ranging from whitest-white to blackest-black are obtained from one of the aforementioned sources, and then converted to color appearance space to generate the neutral color data set. The reference color data set, the plausible color data set, and the possible color data set are placed into the color data descriptor structure in step S805, preferably under corresponding data tags, as depicted in FIG. 5A. The process ends at "return" in step S806.

According to the foregoing features, the present invention provides a color descriptor data structure for a color device, wherein the color descriptor data structure contains a reference boundary descriptor representing measured reference colors of the color device, a plausible boundary descriptor representing plausibly reproducible colors of the color device which include a whitest-white color and a blackest-black color, and a neutral color descriptor representing neutral colors of the color device which extend in range from the whitest-white color to the blackest-black color. The color descriptor data structure of the present invention can then be used to map an unrendered image from a color device, such as a camera or a video camera, to an output medium of an output device, such as a printer, for a proper reproduction of the unrendered image on the output medium, without losing colors outside the range of measured reference colors, such as specular highlights and shadow blacks. The color descriptor data structure of the present invention also allows a user or developer to easily access, identify and modify the measured reference boundary descriptor data and the neutral color data, as needed, to easily achieve a desired rendering intent with respect to the color image data from the corresponding color device.

Although the invention has been described with particular illustrative embodiments, the invention is not limited to the above-described embodiments and various changes and modification may be made by those of ordinary skill in the art without departing from the spirit and scope of the invention.

What is claimed is:

1. A method for generating a color descriptor data structure corresponding to a color device, method comprising the steps of:

generating a reference color data set corresponding to a reference boundary descriptor representing reference colors of the color device based on measured colors from a reference color target;

generating a plausible color data set corresponding to a plausible boundary descriptor representing plausible colors of the color device which are observable, which encompass at least the reference colors of the reference boundary descriptor, and which include a whitest-white color and a blackest-black color;

generating a neutral color data set corresponding to neutral colors of the color device, the neutral colors extending in range from the whitest-white color to the blackest-black color; and adding the reference color data set, the plausible color data set and the neutral color data set in the color descriptor data structure.

2. A method according to claim 1, wherein the color device is a digital camera and the reference color target is created with the digital camera using a standardized color target.

3. A method according to claim 1, wherein the color device is a digital scanner and the reference color target is created with the digital scanner using a standardized color target.

4. A method according to claim 1, wherein the reference color target is a standardized color target corresponding to the color device.

5. A method according to claim 1, wherein the reference color target is a reproducible color target corresponding to the color device.

6. A method according to claim 1, wherein, in the reference color data set generating step, the reference color data set is generated to comprise a plurality of vertices which represents a three-dimensional surface corresponding to the reference boundary descriptor of the color device.

7. A method according to claim 1, wherein, in the plausible color data set generating step, the plausible color data set is generated to comprise a plurality of vertices which represents a three-dimensional surface corresponding to the plausible boundary descriptor of the color device.

8. A method according to claim 1, wherein, in the neutral color data set generating step, the neutral color data set is generated to comprise a plurality of vertices which represents a spline corresponding to the neutral colors of the color device.

9. A method according to claim 1, wherein the spline is comprised of linear segments.

10. A method according to claim 1, wherein, in the reference color data set generating step, the reference color data set is generated to comprise a plurality of polygonal vertex sets, each polygonal vertex set representing a two-dimensional polygonal surface, wherein the plurality of polygonal vertex sets combine to represent a three-dimensional polygonal surface corresponding to the reference boundary descriptor of the color device.

11. A method according to claim 1, wherein, in the plausible color data set generating step, the plausible color data set is generated to comprise a plurality of polygonal vertex sets, each polygonal vertex set representing a two-dimensional polygonal surface, wherein the plurality of polygonal vertex sets combine to represent a three-dimensional polygonal surface corresponding to the plausible boundary descriptor of the color device.

12. A method according to claim 1, wherein, in the plausible color data set generating step, the plausible color data set is generated to comprise color data extrapolated from a mathematical color model representing the color device.

13. A method according to claim 12, wherein the mathematical color model representing the color device is based on the measured colors from the reference color target.

14. A method according to claim 1, wherein, in the adding step, the reference color data set is added to a reference color data tag contained in the color descriptor data structure.

15. A method according to claim 1, wherein, in the adding step, the plausible color data set is added to a plausible color data tag contained in the color descriptor data structure.

16. A method according to claim 1, wherein, in the adding step, the neutral color data set is added to a neutral color data tag contained in the color descriptor data structure.

17. A computing device for generating a color descriptor data structure corresponding to a color device, comprising:
   a program memory for storing process steps executable to perform a method according to any of claims 1 to 16; and
   a processor for executing the process steps stored in said program memory.

18. Computer-executable process steps stored on a computer readable medium, said computer-executable process steps for generating a color descriptor data structure corresponding to a color device, said computer-executable process steps comprising process steps executable to perform a method according to any of claims 1 to 16.

19. A computer-readable medium which stores computer-executable process steps, the computer-executable process steps for generating a color descriptor data structure corresponding to a color device, said computer-executable process steps comprising process steps executable to perform a method according to any of claims 1 to 16.

20. A color processing method comprising:
   obtaining a first color descriptor data structure corresponding to a source device and a second color descriptor data structure corresponding to a destination device; and
   converting input color data depending on the source device to output color data depending on the destination device based on the first and the second color descriptor data structures,
   wherein the first and the second data structure contain
   a reference color data set corresponding to a reference boundary descriptor representing reference colors of the color device based on measured colors from a reference color target; and
   a plausible color data set corresponding to a plausible boundary descriptor representing plausible colors of the color device which are observable, which encompass at least the reference colors of the reference boundary descriptor.

21. A color processing apparatus, comprising:
   an obtaining unit constructed to obtain a first color descriptor data structure corresponding to a source device and a second color descriptor data structure corresponding to a destination device; and
   a converting unit constructed to convert input color data depending on the source device to output color data depending on the destination device based on the first and the second color descriptor data structures,
   wherein the first and the second data structure contain
   a reference color data set corresponding to a reference boundary descriptor representing reference colors of the color device based on measured colors from a reference color target; and
   a plausible color data set corresponding to a plausible boundary descriptor representing plausible colors of the color device which are observable, which encompass at least the reference colors of the reference boundary descriptor.

* * * * *